United States Patent
Mei et al.

(10) Patent No.: US 7,532,438 B1
(45) Date of Patent: May 12, 2009

(54) WIRELESS FLEXURE WITH CURVED TRACE GEOMETRY AGAINST PITCH AND ROLL ADJUSTMENT SPRINGBACK

(75) Inventors: Shijin Mei, Temecula, CA (US); Peter Hahn, Temecula, CA (US); Keith Hong, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 367 days.

(21) Appl. No.: 11/179,686

(22) Filed: Jul. 11, 2005

Related U.S. Application Data

(60) Provisional application No. 60/681,588, filed on May 16, 2005.

(51) Int. Cl.
*G11B 5/48* (2006.01)
(52) U.S. Cl. .................................. 360/245.8
(58) Field of Classification Search ............... 360/245.3, 360/245.8, 245.9, 246, 234.5, 264.2; 29/603.3
See application file for complete search history.

(56) References Cited

U.S. PATENT DOCUMENTS

| | | | | |
|---|---|---|---|---|
| 5,696,651 A * | 12/1997 | Endo et al. | ................ | 360/245.8 |
| 5,933,293 A * | 8/1999 | Bennin | ..................... | 360/245.9 |
| 5,982,584 A * | 11/1999 | Bennin et al. | ............. | 360/245.9 |
| 6,249,404 B1 | 6/2001 | Doundakov et al. | | |
| 6,353,515 B1 * | 3/2002 | Heim | ....................... | 360/245.9 |
| 6,515,832 B1 * | 2/2003 | Girard | ...................... | 360/245.3 |
| 6,539,609 B2 * | 4/2003 | Palmer et al. | ............. | 29/603.03 |
| 6,993,824 B2 * | 2/2006 | Childers et al. | .......... | 29/603.03 |
| 7,006,330 B1 * | 2/2006 | Subrahmanyam et al. | | 360/234.5 |
| 7,006,331 B1 * | 2/2006 | Subrahmanyam et al. | | 360/245.9 |
| 7,051,423 B2 * | 5/2006 | Gouo | ....................... | 29/603.03 |
| 7,099,118 B2 * | 8/2006 | Hutchinson et al. | ...... | 360/245.9 |
| 7,130,157 B2 * | 10/2006 | Sassine et al. | ............. | 360/245.7 |
| 7,403,357 B1 * | 7/2008 | Williams | ................ | 360/245.9 |
| 2004/0181932 A1 * | 9/2004 | Yao et al. | .................. | 29/603.03 |
| 2005/0002125 A1 * | 1/2005 | Ohwe et al. | ............... | 360/234.5 |
| 2005/0047023 A1 * | 3/2005 | Childers et al. | .......... | 360/245.9 |
| 2005/0083611 A1 * | 4/2005 | Shum et al. | ............... | 360/245.8 |
| 2005/0117255 A1 * | 6/2005 | Shang | ...................... | 360/234.5 |
| 2005/0117257 A1 * | 6/2005 | Thaveeprungsriporn et al. | . | 360/246 |
| 2006/0044695 A1 * | 3/2006 | Erpelding | ................ | 360/245.9 |

* cited by examiner

*Primary Examiner*—Tianjie Chen
(74) *Attorney, Agent, or Firm*—Intellectual Property Law Offices of Joel Voelzke, APC

(57) ABSTRACT

A wireless disk drive suspension and method of manufacture in which curvilinear deflections of the plastic film and conductive traces relative to the flexure metal layer provide for containment of the strains accompanying pitch and roll adjustment of the flexure and allow adjustment free of adjusting difficulties and spring back compromise of the adjustment. The curvilinear deflection of the laminate toward the flexure central longitudinal axis and an accompanying bringing in of the flexure frame struts provides a less wide flexure that can more closely approach a disk drive hub for greater capacity in a disk drive.

7 Claims, 3 Drawing Sheets

WIRELESS FLEXURE WITH CURVED TRACE GEOMETRY AGAINST PITCH AND ROLL ADJUSTMENT SPRINGBACK

CROSS-REFERENCE TO RELATED APPLICATIONS

This application claims the benefit of U.S. Provisional Application Ser. No. 60/681,588, filed May 16, 2005

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to wireless disk drive suspensions, and more particularly to improvements in wireless suspension enabling more precise making and retaining of pitch and roll adjustments in the flexure portions of the suspensions.

2. Description of the Related Art

Pitch (Pitch Static Attitude, PSA) and roll (Roll Static attitude, RSA) adjustment of suspensions is a final step in manufacture intended to place the flexure carried slider in its designed disposition. In wireless suspensions this adjustment remains problematical since the stainless steel layer and the polyimide and trace layers have differing responses to the adjustment. In wireless suspensions incorporating flexures, known variously as CIS, TSA and FSA, a typical thickness range for the stainless steel layer is 0.02 to 0.025 mm., the polyimide thickness is about 0.006 to about 0.025 mm., and the copper traces are about 0.008 to about 0.018 mm. Typically, the pitch/roll adjustment of the flexure puts the traces under compression or tension or both sequentially depending on the adjustment being made. Often the adjustment is repeated in a trial and error process, further stressing the traces and putting strain energy into the traces that will springback or return to other than their adjusted state after the adjustment process, compromising the PSA/RSA changes made.

BRIEF SUMMARY OF THE INVENTION

It is an object of the invention to provide an improved suspension, and particularly an improved suspension flexure. It is another object to provide a suspension and flexure therefor where strain energy build-up in the flexure during PSA/RSA adjustments and consequent difficult adjustments and post-adjustment, springback losses of precision are minimized. It is a further object to provide an improved wireless flexure design. Yet another object is to provide a relief from the straight path, minimum material approach of the prior art to introduce curves into the flexure trace and plastic film laminate that offset or absorb the strains imposed by pitch and roll adjustments, making the fact of different materials in the flexure less significant. A further object is to deflect the laminate locally to provide curvilinear shapes for stress take-up. Another object is to deflect the laminate toward the flexure central longitudinal axis and bring the flexure struts in a like amount to narrow the width of the flexure, enabling closer approach of the suspension to the disk drive hub for increased disk drive capacity.

These and other objects of the invention to become apparent hereinafter are realized in a wireless disk drive suspension comprising a beam portion and a flexure frame having a given length between transverse members and subject to tension and compression forces during pitch and roll adjustment of the flexure, the frame comprising a metal layer portion and a laminate portion of trace conductors and an insulative plastic film supported by the metal layer, the flexure having a tongue for supporting a slider, the metal layer portion defining longitudinal struts, the laminate portion of the flexure having a greater length than the flexure frame given length to reversely deflect along its greater length against accumulation of tension or compression forces during the pitch and roll adjustment and adjustment compromising springback.

In this and like embodiments, typically, the metal layer comprises stainless steel, the insulative plastic comprises polyimide, the trace conductors comprise copper, the laminate portion reverse deflection defines a curvilinear lateral displacement of the laminate portion, the flexure frame has a central longitudinal axis, the curvilinear lateral displacement of the laminate portion being away from the frame central longitudinal axis, or the curvilinear lateral displacement of the laminate portion being toward the frame central longitudinal axis, or the curvilinear lateral displacement of the laminate is both toward and away from the frame central longitudinal axis, the curvilinear lateral displacement of the laminate is serpentine and has an intermediate section displaced toward the frame central longitudinal axis, and/or the flexure frame metal layer portion is displaced oppositely from the laminate portion intermediate section displacement relative to the frame central longitudinal axis.

In a further embodiment, the invention provides a wireless disk drive suspension comprising a beam portion and a flexure frame comprising a metal layer portion and a laminate portion of trace conductors and an insulative plastic film supported by the metal layer, the flexure having a tongue for supporting a slider, the metal layer portion defining left and right longitudinal struts between the transverse members, the laminate portion of the flexure having left and right extents reversely deflected to have their respective intermediate sections displaced inward toward the central longitudinal axis of the frame, the metal layer portion struts having middle regions lying along the laminate portion displaced intermediate sections to reduce the width of the flexure by approximately the displacement of the intermediate sections for relatively closer positioning of the flexure to a disk drive hub. As in the previous embodiment the flexure preferably comprises stainless steel, polyimide and copper, and the laminate portion reverse deflection defines a curvilinear lateral displacement of the laminate portion.

The invention methods include a method of manufacturing a wireless disk drive suspension comprising a beam portion and a flexure frame having a central longitudinal axis and comprising a metal layer portion and a laminate portion of trace conductors and an insulative plastic film supported by the metal layer, including reversely deflecting the laminate portion along its metal layer supported length, pitch and roll adjusting the flexure, and blocking accumulation of tension or compression forces in the laminate portion with the reverse deflection in the laminate portion during the pitch and roll adjustment and adjustment against adjustment compromising springback thereof.

In this and like embodiments, typically, the method includes selecting stainless steel as the metal layer, polyimide as the insulative plastic, and copper as the trace conductors, defining a curvilinear lateral displacement of the laminate portion with the reverse deflection thereof, displacing the curvilinear lateral displacement of the laminate portion away from the frame central longitudinal axis or toward the frame central longitudinal axis, displacing the flexure frame metal layer portion oppositely from the laminate portion displacement relative to the frame central longitudinal axis, displacing the curvilinear lateral displacement of the laminate both toward and away from the frame central longitudinal axis, serpentine-displacing the curvilinear lateral displacement of the laminate, and displacing an intermediate section thereof toward the frame central longitudinal axis, and/or displacing the flexure frame metal layer portion oppositely from the laminate portion intermediate section displacement relative to the frame central longitudinal axis.

In a further embodiment, the invention provides a method of manufacturing a wireless disk drive suspension comprising a beam portion and a flexure frame having a central longitudinal axis and longitudinally spaced transverse members comprising a metal layer portion and a laminate portion of trace conductors and an insulative plastic film supported by the metal layer, defining middle regions in left and right longitudinal struts between the transverse members, defining in the laminate portion left and right extents reversely deflected to have their respective intermediate sections displaced inward toward the central longitudinal axis of the frame, displacing the metal layer portion struts middle regions to lie along the laminate portion displaced intermediate sections, whereby the width of the flexure is reduced by approximately the displacement of the intermediate sections for relatively closer positioning of the flexure to a disk drive hub.

BRIEF DESCRIPTION OF THE SEVERAL VIEWS OF THE DRAWINGS

The invention will be further described in conjunction with the attached drawings in which.

DETAILED DESCRIPTION OF THE INVENTION

Figure 1:
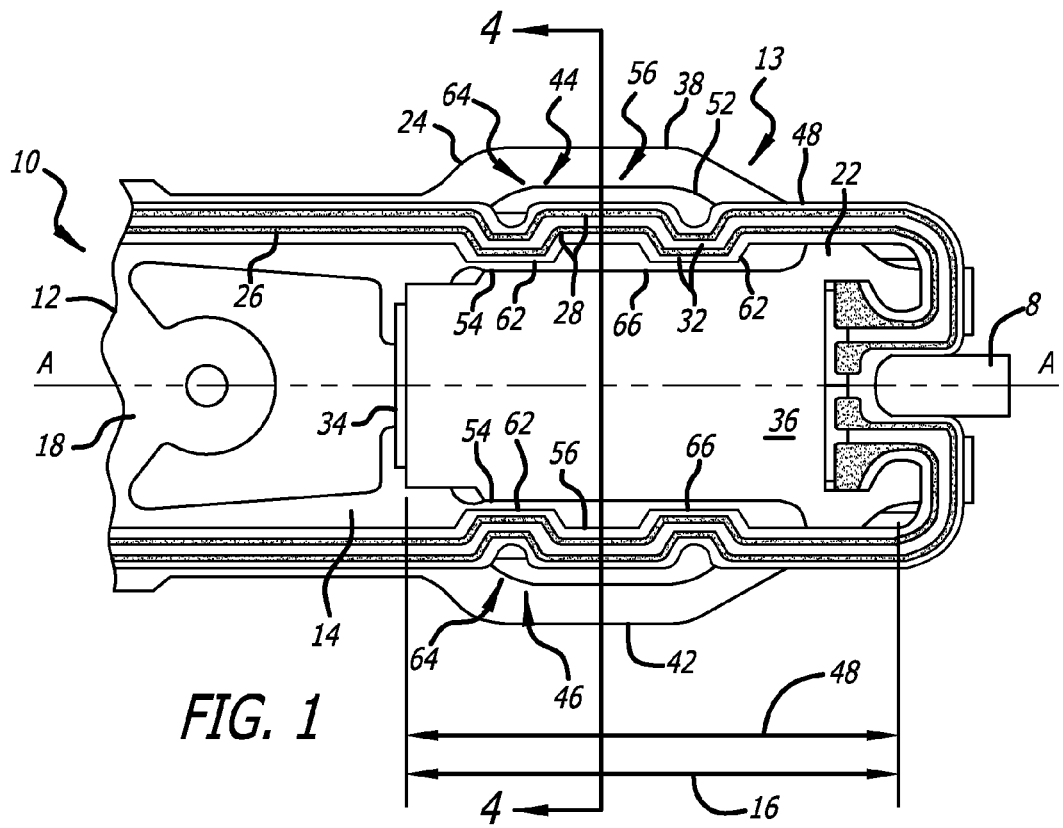
FIG. 1 is a plan view of the invention suspension and flexure.
Figure 2:
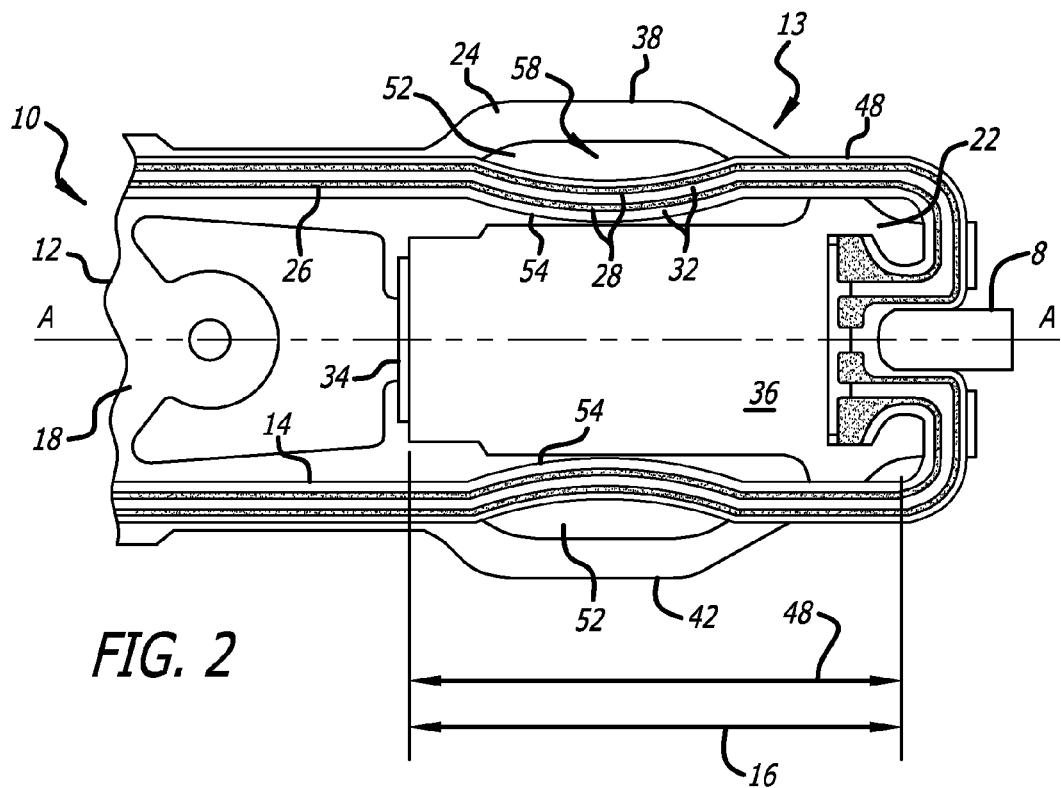
FIG. 2 is a plan view of another embodiment thereof.

With reference now to the drawings in detail, in FIGS. 1 and 2 a wireless disk drive suspension 10 comprises a beam portion 12 and a flexure 13 comprising a frame 14 having a given length 16 between longitudinally spaced transverse members 18, 22. Flexure frame 14 is subject to tension and compression forces during pitch and roll adjustment of the flexure 13. Flexure frame 14 comprises a metal layer portion 24 and a laminate portion 26 of trace conductors 28 and an insulative plastic film 32 supported by the metal layer. Flexure frame 14 has a tongue 34 supporting a slider 36. Flexure metal layer portion 24 defines longitudinal struts 38, 42. Laminate portion 26 of the flexure frame 14 divides into left and right extents 44, 46. Each laminate portion part 44, 46 has a greater length 48 than the flexure frame given length 16 and to fit within the given extent 16 is reversely deflected as shown at 52 along its greater length 48 against accumulation of tension or compression forces therein during the pitch and roll adjustment and adjustment compromising springback.

As noted, metal layer portion 24 can comprise stainless steel, the insulative plastic film 32 of laminate portion 26 comprises polyimide, and the trace conductors 28 comprise copper.

The laminate portion 26 reverse deflection 52 defines a curvilinear lateral displacement 54 of the laminate portion. Flexure frame 14 has a central longitudinal axis A-A. The curvilinear lateral displacement 54 of the laminate portion 26 can be away from the frame central longitudinal axis A-A, see 56 in FIG. 1, or toward the frame central longitudinal axis, see 58 in FIG. 2. Alternatively, again with reference to FIG. 1, the curvilinear lateral displacement of the laminate is both toward 62 and away 56 from the frame central longitudinal axis A-A, such that the curvilinear lateral displacement 56, 62 of the laminate portion 26 is serpentine 64. When serpentine, laminate portion 26 has an intermediate section 66 displaced toward the frame central longitudinal axis A-A. And, the flexure frame metal layer portion 24 can be displaced oppositely, (i.e. outwardly from axis A-A), from the laminate portion intermediate section 66 displacement relative to the frame central longitudinal axis. The inward deflection of intermediate sections 66 in FIG. 2, provides good access to struts 38, 42 which is useful for RSA and PSA adjustments.

As shown in FIG. 2, the laminate portion in the area longitudinally between the longitudinal struts, intermediate section 66, is displaced inward toward axis A-A from the laminate portion proximate to and distal to the area longitudinally between the struts.

Figure 3:
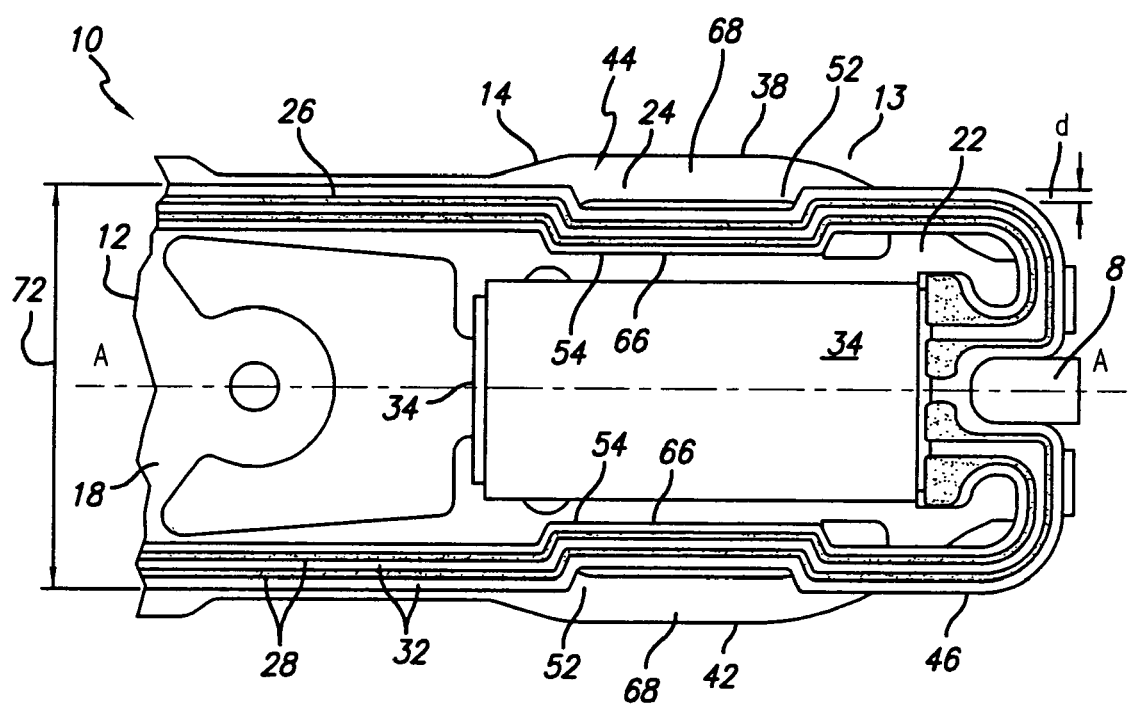
FIG. 3 is a plan view of a further embodiment thereon.
Figure 4:
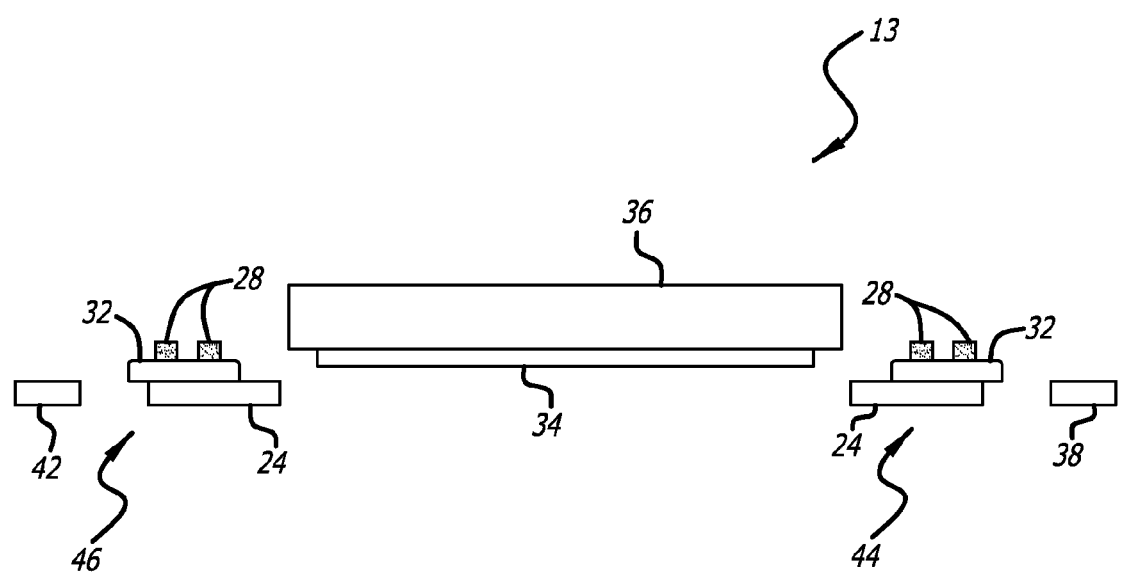
FIG. 4 is a cross section view of the suspension and flexure of FIG. 1 taken along line 4-4.

In a further embodiment, shown in FIG. 3, a wireless disk drive suspension 10 comprises a beam portion 12 and a flexure 13 comprising a frame 14. Flexure frame 14 comprises a metal layer portion 24 and a laminate portion 26 of trace conductors 28 and an insulative plastic film 32 supported by the metal layer. Flexure frame 14 has a tongue 34 for supporting a slider 36. Metal layer portion 24 defines left and right longitudinal struts 38, 42 between transverse members 18, 22. The laminate portion 26 of the flexure frame has left and right extents 44, 46 reversely deflected at 52 to have their respective intermediate sections 66 displaced inward toward the central longitudinal axis A-A of the frame 24. Metal layer portion struts 38, 42 have middle regions 68 lying along the laminate portion displaced intermediate sections 66, rather than spaced well outboard thereof as in FIGS. 1 and 2, to reduce the width 72 of the flexure frame 14 by approximately the displacement d of the intermediate sections 66 for relatively closer positioning of the flexure 13 to a disk drive hub (not shown).

Typical pitch, roll and stiffness values for the FIGS. 1-3 embodiments are provided in the TABLE following.

TABLE 1

| | Flexure Stiffness (CIS) | | |
|---|---|---|---|
| | Pitch Stiffness (μNM/deg) | Roll Stiffness (μNM/deg) | Lateral Stiffness (N/mm) |
| Case 1 (FIG. 1)[1] | 0.71 | 0.67 | 2.40 |
| Case 2 (FIG. 2)[1] | 0.72 | 0.68 | 2.41 |
| Case 3 (FIG. 3)[2] | 0.70 | 0.70 | 2.20 |

[1]Stainless Steel: 25 μm; Polyimide: 6 μm; Copper Layer: 10 μm.
[2]Stainless Steel: 25 μm; Polyimide: 10 μm; Copper Layer: 10 μm.

The invention methods include a method of manufacturing a wireless disk drive suspension 10 comprising a beam portion 12 and a flexure 13 comprising a frame 14 having a central longitudinal axis A-A and comprising a metal layer portion 24 and a laminate portion 26 of trace conductors 28 and an insulative plastic film 32 supported by the metal layer portion 24. The method includes reversely deflecting the laminate portion 26 along its metal layer 24 supported length, pitch and roll adjusting the flexure 13, and blocking accumulation of tension or compression forces in the laminate portion with the reverse deflection 52 in the laminate portion during the pitch and roll adjustment against adjustment-compromising springback thereof.

The foregoing embodiment of the invention method further includes selecting stainless steel as the metal layer 24, polyimide as the insulative plastic 32, and copper as the trace conductors 28. According to the method a curvilinear lateral displacement 54 of the laminate portion 26 is defined with the reverse deflection 52 thereof, displacing the curvilinear lateral displacement 56 of the laminate portion away from the frame central longitudinal axis A-A, or toward 58 the frame central longitudinal axis, displacing the flexure frame metal layer portion 24 oppositely from the laminate portion displacement relative to the frame central longitudinal axis, displacing the curvilinear lateral displacement of the laminate both toward and away 56, 62 from the frame central longitudinal axis, serpentine 64-displacing the curvilinear lateral displacement 56, 62 of the laminate, and displacing an intermediate section 66 thereof toward the frame central longitudinal axis, and/or displacing the flexure frame metal layer portion oppositely from the laminate portion intermediate section displacement relative to the frame central longitudinal axis.

In a further invention embodiment a method of manufacturing a wireless disk drive suspension 10 comprising a beam portion 12 and a flexure 13 comprising a flexure frame 14 having a central longitudinal axis A-A and longitudinally spaced transverse members 18, 22 comprising a metal layer portion 24 and a laminate portion 26 of trace conductors 28 and an insulative plastic film 32 supported by the metal layer, includes defining middle regions 68 in left and right longitudinal struts 38, 42 between the transverse members, defining in the laminate portion left and right extents 44, 46 reversely deflected at 52 to have their respective intermediate sections 66 displaced inward toward the central longitudinal axis of the frame, displacing the metal layer portion strut middle regions to lie along the laminate portion displaced intermediate sections, whereby the width 72 of the flexure 13 is reduced by approximately the displacement d of the intermediate sections for relatively closer positioning of the flexure to a disk drive hub (not shown).

The invention thus provides an improved wireless suspension and suspension flexure design wherein strain energy build-up in the flexure during PSA/RSA adjustments and consequent difficult adjustments and post-adjustment, springback losses of precision are minimized by providing relief from the straight path, minimum material approach of the prior art to introduce curves into the flexure trace and plastic film laminate that offset or absorb the strains imposed by pitch and roll adjustments, making the fact of different materials in the flexure less significant. The invention further provides a local deflection in the flexure laminate to provide curvilinear shapes for stress take-up. The invention further provides for the deflection of the laminate toward the flexure central longitudinal axis and the bringing in of the flexure struts a like amount to narrow the width of the flexure, enabling closer approach of the suspension to the disk drive hub for increased disk drive capacity.

The foregoing objects are thus met.

We claim:

1. A disk drive suspension comprising a beam portion and a flexure having a central longitudinal axis and a tongue for supporting a slider, the flexure comprising a laminate portion of trace conductors and an insulative film, wherein a laminate portion disposed on a first lateral side of the central longitudinal axis bends multiple times in toward the axis in the area lateral to the slider and within a longitudinal extent thereof, and bends multiple times away from the axis in the area lateral to the slider and within the longitudinal extend thereof, wherein the bends lessen the accumulation of tension or compression forces during a pitch and roll adjustment.

2. The suspension of claim 1 wherein said laminate portion is serpentine in the area lateral to the slider and within the longitudinal extent thereof.

3. The suspension of claim 1 wherein the inward bends are curvilinear.

4. The suspension of claim 1 in which said trace conductors comprise copper and said insulative film comprises polyimide.

5. A disk drive suspension comprising a beam portion and a flexure having a central longitudinal axis and a tongue for supporting a slider, the flexure comprising a laminate portion of trace conductors and an insulative film, said laminate portion being disposed on a first lateral side of side axis, wherein the laminate portion bends multiple times toward the axis in an area lateral to the tongue and bends multiple times away from the axis in the area lateral to the tongue within a longitudinal extent thereof.

6. The suspension of claim 5 wherein the inward bends are curvilinear.

7. The suspension of claim 5 in which said trace conductors comprise copper and said insulative film comprises polyimide.

* * * * *

UNITED STATES PATENT AND TRADEMARK OFFICE
CERTIFICATE OF CORRECTION

PATENT NO. : 7,532,438 B1
APPLICATION NO. : 11/179686
DATED : May 12, 2009
INVENTOR(S) : Shijin Mei, Peter Hahn and Keith Hong Page 1 of 1

It is certified that error appears in the above-identified patent and that said Letters Patent is hereby corrected as shown below:

In Claim 5, column 6, line 39, delete "side axis" and insert --said axis--.

Signed and Sealed this

Thirtieth Day of June, 2009

JOHN DOLL
*Acting Director of the United States Patent and Trademark Office*